United States Patent [19]

Aoki

[11] Patent Number: 5,218,608
[45] Date of Patent: Jun. 8, 1993

[54] OPTICAL FIBER AMPLIFIER

[75] Inventor: Yasuhiro Aoki, Tokyo, Japan

[73] Assignee: NEC Corporation, Tokyo, Japan

[21] Appl. No.: 826,999

[22] Filed: Jan. 28, 1992

[30] Foreign Application Priority Data

Jan. 28, 1991 [JP] Japan ................ 3-8180

[51] Int. Cl.$^5$ .............................................. H01S 3/30
[52] U.S. Cl. .......................................... 372/6; 372/71;
372/75; 359/341
[58] Field of Search ................... 372/6, 69, 70, 71, 75;
359/341

[56] References Cited

U.S. PATENT DOCUMENTS

| | | | |
|---|---|---|---|
| 5,050,949 | 9/1991 | DiGiovanni et al. | 372/6 |
| 5,138,483 | 8/1992 | Grasso et al. | 372/6 |
| 5,140,456 | 8/1992 | Huber | 372/6 |

FOREIGN PATENT DOCUMENTS 0427320 5/1991 European Pat. Off. ................ 372/6

OTHER PUBLICATIONS

R. I. Laming and D. N. Payne, "Noise Characteristics of Erbium-Doped Fiber Amplifier Pumped at 980 nm", IEEE Photonics Technology Letters, vol. 2, No. 6, Jun. 1990, pp. 418-421.

*Primary Examiner*—Georgia Y. Epps
*Attorney, Agent, or Firm*—Sughrue, Mion, Zinn, Macpeak & Seas

[57] ABSTRACT

A signal light is coupled by a light coupler/splitter (31) with a 0.98 micron first pumping light ($\lambda_1$) generated by a first pumping light source (21), and the coupled light is launched into an Er-doped optical fiber (1). The signal light is optically amplified in the Er-doped optical fiber. A 1.48 micron second pumping light ($\lambda_2$) generated by second pumping light source (22) is launched into the Er-doped optical fiber (1) with a light coupler/splitter (32). This 1.48 micron pumping light contributes boost the amplified signal.

9 Claims, 2 Drawing Sheets

OPTICAL FIBER AMPLIFIER

BACKGROUND OF THE INVENTION

The present invention relates to an optical fiber amplifier, and more particularly to an optical amplifier using an erbium-doped optical fiber.

In recent years, active research has been made on optical amplifiers which amplify the signal light without photoelectric conversion with a view to reducing the size and cost of repeaters for optical communication or compensating for losses due to light branching. The systems of optical amplification so far reported include one using semiconductor laser and another using an optical fiber whose core is doped with a rare-earth element such as erbium (Er). Many research and development attempts are being made on optical amplifiers using an Er-doped optical fiber (Er-doped optical fiber amplifiers) because of their advantages such as the high gain of 30 dB or more they provide in the 1.55 micron wavelength band, which is the lowest loss wavelength region for optical fibers, and the scarce polarization-dependence of the gain. For more information on one of these Er-doped optical fiber amplifiers, reference may be made to R. I. Laming et al., "Noise Characteristics of Erbium-Doped Fiber Amplifiers Pumped at 980 nm" in IEEE PHOTONICS TECHNOLOGY LETTERS, Vol. 2., No. 6, (June 1990) 418–421.

This Er-doped optical fiber amplifier amplifies a signal light by simultaneously bringing into incidence on an optical fiber a pumping light having a wavelength equal to the absorption wavelength of Er ions. Known incident directions of the pumping light are forward pumping to launch the signal light and the pumping light into incidence so that they propagate in the same direction in the optical fiber, backward pumping to launch the two lights so that they propagate in reverse directions to each other, and hybrid pumping using both forward pumping and backward pumping. The wavelength ranges of the pumping light in common use include the 0.5 micron, 0.6 micron, 0.8 micron, 0.98 micron and 1.48 micron bands, of which the 0.98 micron and 1.48 micron bands are considered the most useful for practical purposes as they are free from excited state absorption (a phenomenon in which excited electrons are excited to a still higher level) and can provide high gains.

An Er-doped optical fiber amplifier for use in optical communication should desirably give a high saturation output and be relatively noise-free (low in noise figure). In case of the 1.48 micron band pumping, however, the saturation output is high but the noise figure is high, while in case of the 0.98 micron band pumping, the saturation output is low but it provides a low noise figure.

The saturation output $P_s$ can be represented by Equation (1) where $P_p$ is the pumping light power, $\lambda_s$ is the signal light wavelength and $\lambda_p$ is the pumping light wavelength:

$$P_s = (\lambda_p/\lambda_s) P_p \tag{1}$$

Therefore, if $\lambda_s$ equals 1.55 microns and a pumping light of 1.48 microns is used, the ratio of conversion of the pumping light into the signal light ($P_s/P_p$) will be 95%. Where a pumping light of 0.98 micron is used, $P_s/P_p$ will be 63%.

Then the noise figure NF can be generally represented by $$NF = 2N2/(N2 - N1) \tag{2}$$

where N2 is the number of electrons at the upper level and N1, that at the lower level. In the case of 0.98 micron band pumping, the energy difference between the exciting level and the upper level will be sufficiently great, and N1 will be 0 under highly excited state condition, resulting in an ideal NF of 3 dB. However, in the 1.48 microns band pumping where the exciting level and the upper level are close to each other, electrons will remain at the exciting and the lower levels even if greatly the pumping light power is increased. Consequently, there will exist electrons of N1 = 0.38 N2, resulting in an NF = 5.1 dB.

SUMMARY OF THE INVENTION

An object of the present invention is to provide an Er-doped optical fiber amplifier which is susceptible to less noise and gives a greater saturation output than conventional such amplifiers, free from the aforementioned disadvantages in pumping in the 0.98 micron and 1.48 micron bands.

According to the first aspect of the invention, there is provided an optical fiber amplifier comprising:
  an impurity-doped optical fiber;
  first pumping light generating means for supplying a first pumping light of a first light wavelength selected from the absorption wavelength bands of said optical fiber;
  second pumping light generating means for supplying a second pumping light of a second light wavelength which is a longer wavelength than said first wavelength in said absorption wavelength bands:
  light coupling means for coupling a signal light and said first pumping light and supplying the coupled light to the input end of said optical fiber; and
  light coupling/splitting means for supplying said second pumping light to said optical fiber from the signal output terminal of said optical fiber in the direction reverse to said signal light and, at the same time, taking out the signal light wavelength from said optical fiber.

According to the second aspect of the invention, there is provided an optical fiber amplifier comprising:
  a first impurity-doped optical fiber;
  a second impurity-doped optical fiber;
  first pumping light generating means for supplying a first pumping light of a first light wavelength selected from the absorption wavelength bands of said first and second optical fibers;
  second pumping light generating means for supplying a second pumping light of a second light wavelength which is a longer wavelength than said first wavelength in said absorption wavelength bands:
  first light coupling means for coupling a signal light and said first pumping light and supplying them as a first coupled light to said first optical fiber; and
  second light coupling means for coupling said first coupled light and said second pumping light and supplying them as a second coupled light to said second optical fiber; and
  separating means, connected to the output end of said second optical fiber, for taking out the wavelength component of said signal light from the output of said second optical fiber.

Note being taken of the fact that a low noise feature can be achieved in pumping at a wavelength sufficiently shorter than the wavelength of the signal light, such as in the 0.98 micron band, and a high saturation output can be attained in pumping in the vicinity of the signal light wavelength, such as in the 1.48 microns band. In a region where the amplified signal light power is small, amplified spantaneous emission noise is suppressed by pumping an Er-doped optical fiber at a wavelength λ1. In a region where the signal light power is relatively large, pumping is done at a wavelength λ2 to increase the saturation output.

According to the first aspect of the invention, the Er-doped optical fiber is pumped forward with a pumping light of the wavelength λ1 and backward with a pumping light of the wavelength λ2.

According to the second aspect of the invention, two or more Er-doped optical fibers in optically cascade connection are used, and pumping is accomplished at the wavelength λ1 at least in the initial stage of an optical fiber amplifying section on the signal input side, and at the wavelength λ2 in the final stage of the optical fiber amplifying section. Whereas a plurality of Er-doped optical fibers are required in this case, both forward pumping and backward pumping are possible, permitting free choice. If the gain in each optical amplifying section is increased here, noise light arising in an amplifier of a downstream stage may leak into an amplifier of an upstream stage to cause oscillation or some other instability, but this trouble can be averted by inserting an optical isolator between the Er-doped optical fibers.

DETAILED DESCRIPTION OF THE PREFERRED EMBODIMENTS

Figure 1:
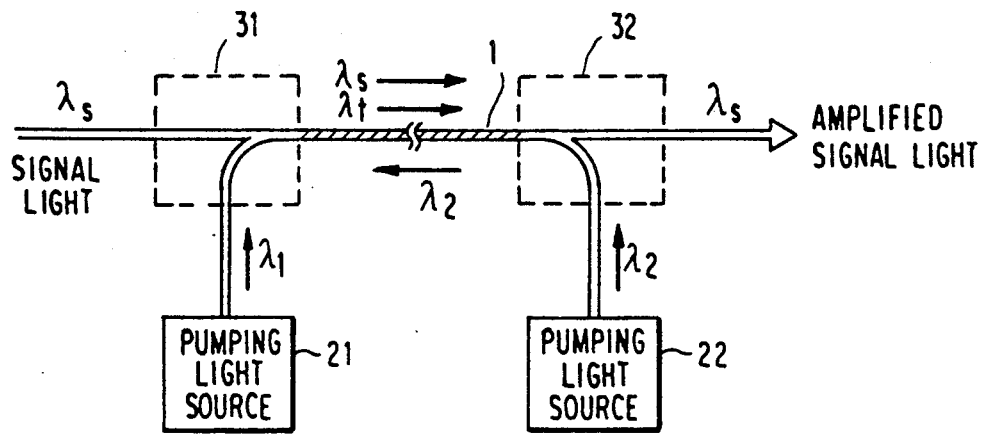
FIG. 1 illustrates the first preferred embodiment of the present invention.

FIG. 1 illustrates the configuration of an optical fiber amplifier, which is a first preferred embodiment of the present invention. Referring to the figure, an optical fiber 1 is an Er-doped single mode optical fiber of 7 microns in core diameter, 20 m in length and 300 ppm in Er concentration; a first pumping light source (PLS) 21 is an InGa-As/AlGaAs strained superlattice semiconductor laser of 0.98 micron in wavelength and 100 mW in maximum output; and a second PLS 22 is an InGaAsP/Inp Febry-Pérot semiconductor laser of 1.48 microns in wavelength and 200 mW in maximum output. A light coupler/splitter 31 is a single mode optical fiber coupler capable of coupling and splitting a signal light of 1.55 microns in wavelength with a pumping light of 0.98 micron in wavelength, and a light coupler/splitter 32 is a single mode optical fiber coupler for coupling and splitting a signal light of 1.55 microns in wavelength with a pumping light of 1.48 microns in wavelength. Neither of these optical fiber coupler/splitters is susceptible to a loss of more than 0.5 dB at a wavelength of 1.55 microns, and they are fusion spliced to the Er-doped optical fiber 1 at a loss of less than 0.1 dB.

In this optical fiber amplifier, the signal light, after being coupled with the pumping light of 0.98 micron in wavelength, which is emitted from the PLS 21, by the optical fiber coupler 31, is coupled into the Er-doped optical fiber 1. The signal light amplified in this Er-doped optical fiber is demultiplexed with the pumping light and then outputted by the optical fiber coupler 32. Meanwhile, the pumping light of 1.48 microns in wavelength from the PLS 22 is brought to incidence by the optical fiber coupler 32 on the Er-doped optical fiber 1 in a backward pumping configuration.

Figure 2:
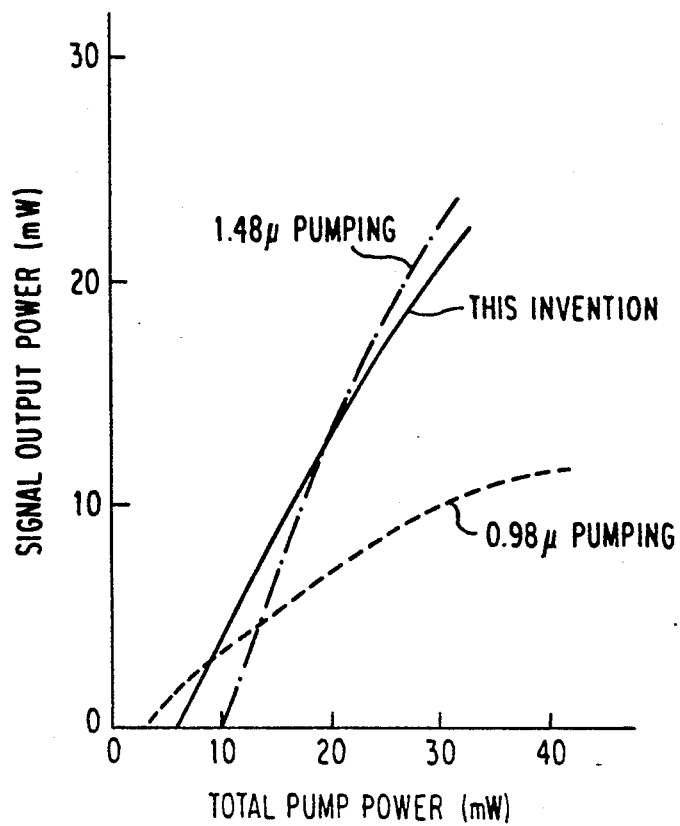
FIG. 2 is a diagram showing the relationship of the output signal light power to the pumping light power in the first embodiment.

FIG. 2 is a diagram showing the measured relationship of the output signal light power to the pumping light power obtained with this preferred embodiment. In this measurement, the signal input light power was −10 dBm. The ratio between the 0.98 micron pumping light power and the 1.48 microns pumping light power was kept constant at 1:9. For the sake of comparison with the prior art, a case in which only a 0.98 micron pumping light was used (represented by the broken line in FIG. 2) and another case in which only a 1.48 microns pumping light was used (the chain line in FIG. 2) are also included. As is evident from FIG. 2, a conversion efficiency of about 70% is achieved with this embodiment, about the same level of outout as in the case of using 1.48 microns pumping.

Figure 3:
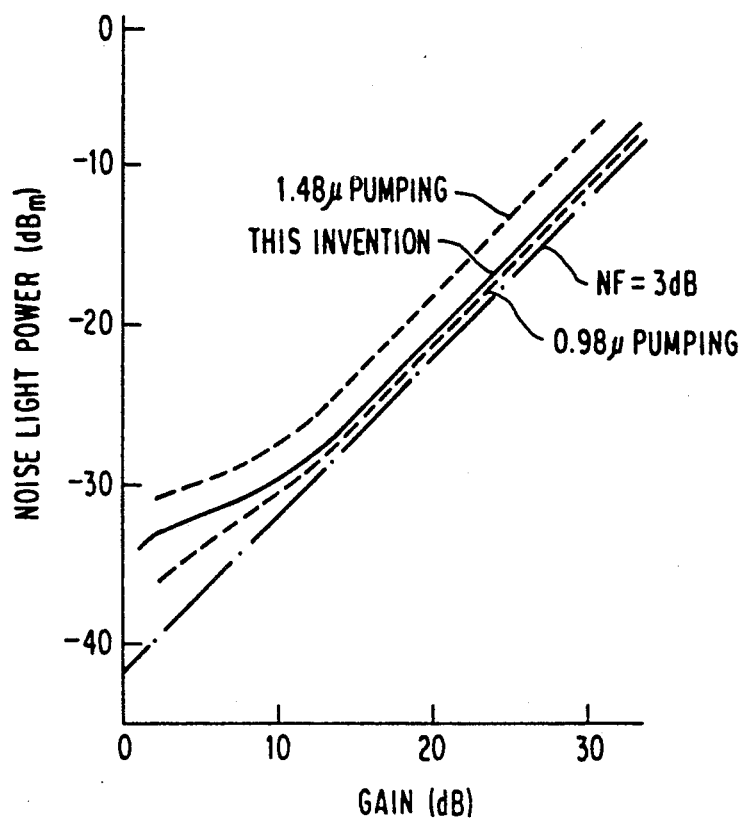
FIG. 3 is a diagram showing the relationship of the noise light power to the gain in the first embodiment.

FIG. 3 shows the relationship of the noise light power to the gain measured under the same exciting conditions as for FIG. 2. Herein, the signal input light power is −35 dBm. In this figure, too, for the sake of comparison with the prior art, cases in which only a 0.98 micron pumping light and only a 1.48 microns pumping light were respectively used are also included. The noise figure (NF) in this embodiment, as estimated from these findings, is 3.5 dB, comparable to that in the low-noise case of 0.98 micron pumping.

Figure 4:
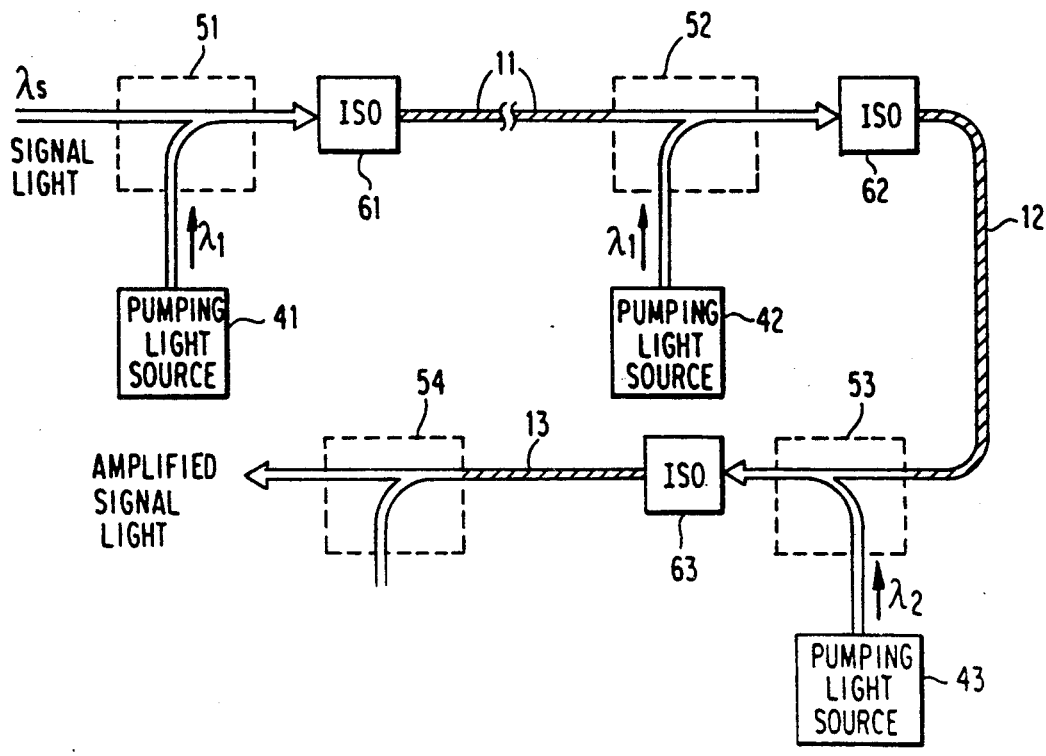
FIG. 4 illustrates a second preferred embodiment of the invention.

Now, FIG. 4 illustrates an optical fiber amplifier which is a second preferred embodiment of the present invention, in which three Er-doped optical fibers are used, connected in cascade. In the figure, Er-doped fibers 11, 12 and 13, each 10 m long, are of the same type as what is used in the first embodiment. The PLS's include sources 41 and 42, both of which are InGaAs-/AlGaAs strained superlattice semiconductor lasers of 0.98 microns in wave-length, and a source 43, which is an InGaAsP/InP Fabry-Pérot semiconductor laser of 1.48 microns in wavelength. The light coupler/splitters include single mode optical fiber u couplers 51 and 52, both for 1.55 microns/0.98 micron coupling and splitting, and another single mode optical fiber coupler for 1.55 microns/1.48 microns coupling and splitting. Optical isolators 61, 62 and 63 are polarization-independent ones of 1.5 dB in insertion loss.

In this second preferred embodiment, the signal light is first coupled by the optical fiber coupler 51 with the 0.98 micron pumping light emitted from the PLS 41 and, after passing the optical isolator 61, it is brought to incidence on the Er-doped optical fiber 11. The signal light amplified in this Er-doped optical fiber 11, after going through a similar procedure twice, it was further amplified. Then, the eventual amplified signal is demultiplexed with the pumping light to obtain an output. In this embodiment, forward pumping is used.

This configuration, when the pumping light powers of 0.98 and 1.48 microns in wavelength were 30 mW and 100 mW, respectively, gave a small signal gain of 65 dB and a high saturation signal output (the signal output at which the gain drops by 3 dB) of about 14 dBm. The NF at this time was 3.2 dB, which means the realization of an optical fiber amplifier featuring both a high saturation output and a low noise level close to the theoretical limit.

Although the foregoing description of the optical fiber amplifiers according to the present invention referred to specific preferred embodiments thereof, a number of variations are conceivable for the materialization of the invention instead of being limited to these embodiments.

For instance, though the wavelength of the PLS on the shorter wavelength side was supposed to be 0.98 micron, it may as well be matched with another absorption wavelength of Er ions such as the 0.5 micron, 0.6 micron or 0.8 micron band, and any other kind of laser can be used. Obviously, the high coupling/splitting means for the pumping light may as well be a dichroic mirror or any other optical elements having the required performance features. Nor are the Er concentration, size and the number of Er-doped optical fibers to be connected in cascade limited to those used in these embodiments.

As hitherto described, the optical fiber amplifier according to the present invention uses two kinds of PLS's having two different wavelengths $\lambda 1$ and $\lambda 2$ ($\lambda 1 < \lambda 2$), and pumps an Er-doped optical fiber with the shorter-wavelength ($\lambda 1$) pumping light in a region where the amplified signal light power is smaller and the longer-wavelength ($\lambda 2$) pumping light in a region where the signal light power is greater. This results in the advantage of providing an optical fiber amplifier featuring both low noise and a high saturation output.

What is claimed is:

1. An optical fiber amplifier comprising:
   an impurity-doped optical fiber;
   first pumping light generating means for supplying a first pumping light of a first light wavelength selected from the absorption wavelength bands of said optical fiber;
   second pumping light generating means for supplying a second pumping light of a second light wavelength which is a longer wavelength than said first wavelength in said absorption wavelength bands;
   light coupling means for coupling a signal light and said first pumping light and supplying the coupled light to the input end of said optical fiber; and
   light coupling/splitting means for supplying said second pumping light to said optical fiber from the signal output terminal of said optical fiber in the direction reverse to said signal light and, at the same time, taking out the signal light from said optical fiber.

2. An optical fiber amplifier, as claimed in claim 1, wherein said impurity is erbium.

3. An optical fiber amplifier, as claimed in claim 2, wherein said first light wavelength is 0.98 microns and said second light wavelength is 1.48 microns.

4. An optical fiber amplifier, as claimed in claim 2, wherein the density of said erbium is 300 ppm.

5. An optical fiber amplifier comprising:
   a first impurity-doped optical fiber;
   a second impurity-doped optical fiber;
   first pumping light generating means for supplying a first pumping light of a first light wavelength selected from the absorption wavelength bands of said first and second optical fibers;
   second pumping light generating means for supplying a second pumping light of a second light wavelength which is a longer wavelength than said first wavelength in said absorption wavelength bands;
   first light coupling means for coupling a signal light and said first pumping light and supplying them as a first coupled light to said first optical fiber; and
   second light coupling means for coupling said first coupled light and said second pumping light and supplying them as a second coupled light to said second optical fiber; and
   separating means, connected to the output end of said second optical fiber, for taking out the wavelength component of said signal light from the output of said second optical fiber.

6. An optical fiber amplifier, as claimed in claim 5, wherein said impurity is erbium.

7. An optical fiber amplifier, as claimed in claim 6, wherein said first light wavelength is 0.98 microns and said second light wavelength is 1.48 microns.

8. An optical fiber amplifier, as claimed in claim 6, wherein the density of said erbium is 300 ppm.

9. An optical fiber amplifier, as claimed in claim 5, further including:
   first optical isolator means provided between said first coupling means and said first optical fiber; and
   second optical isolator means provided between said second coupling means and said second optical fiber.

* * * * *